United States Patent
Okabe et al.

(10) Patent No.: US 10,683,870 B2
(45) Date of Patent: Jun. 16, 2020

(54) IMPELLER COVER, ROTARY MACHINE, AND IMPELLER COVER MANUFACTURING METHOD

(71) Applicant: MITSUBISHI HEAVY INDUSTRIES ENGINE & TURBOCHARGER, LTD., Kanagawa (JP)

(72) Inventors: Ryoji Okabe, Tokyo (JP); Yasunori Watanabe, Tokyo (JP); Isao Tomita, Tokyo (JP); Takashi Arai, Tokyo (JP); Hiroyuki Arimizu, Tokyo (JP)

(73) Assignee: MITSUBISHI HEAVY INDUSTRIES ENGINE & TURBOCHARGER, LTD., Sagamihara-Shi (JP)

(*) Notice: Subject to any disclaimer, the term of this patent is extended or adjusted under 35 U.S.C. 154(b) by 81 days.

(21) Appl. No.: 15/555,683

(22) PCT Filed: Mar. 24, 2015

(86) PCT No.: PCT/JP2015/058854
§ 371 (c)(1),
(2) Date: Sep. 5, 2017

(87) PCT Pub. No.: WO2016/151747
PCT Pub. Date: Sep. 29, 2016

(65) Prior Publication Data
US 2018/0045211 A1 Feb. 15, 2018

(51) Int. Cl.
*F04D 29/16* (2006.01)
*F01D 11/12* (2006.01)
(Continued)

(52) U.S. Cl.
CPC .......... *F04D 29/162* (2013.01); *F01D 11/122* (2013.01); *F02B 39/00* (2013.01);
(Continued)

(58) Field of Classification Search
CPC ..... F04D 29/162; F04D 29/4206; F16J 15/38; F16J 15/14; F01D 11/122; F01D 9/045;
(Continued)

(56) References Cited

U.S. PATENT DOCUMENTS

2012/0292550 A1* 11/2012 Meek .................... F16K 3/0236
251/359
2014/0147256 A1 5/2014 Isogai
(Continued)

FOREIGN PATENT DOCUMENTS

DE 11 2015 006 225 T5 11/2017
JP 2004-324569 A 11/2004
(Continued)

OTHER PUBLICATIONS

JP-2011190705-A—English Translation (Year: 2010).*
(Continued)

*Primary Examiner* — Joseph J Dallo
*Assistant Examiner* — Scott A Reinbold
(74) *Attorney, Agent, or Firm* — Birch, Stewart, Kolasch & Birch, LLP (57) ABSTRACT

This impeller cover is provided with: a machinable abradable seal section which has a shroud surface, which faces the outer peripheral surface of an impeller rotating about its axis, and which provides a seal between the outer peripheral surface and the shroud surface; a cover body which covers the impeller from the outside and which has a seal housing section for housing the abradable seal section therein; and a filling material which is interposed between the abradable seal section and the cover body. The seal housing section has a fitting inner peripheral surface which is extended along the axis in order for the outer peripheral surface of the abradable seal section to fit thereto, a reference surface which is used for axial positioning of the abradable seal section by being (Continued)

brought into contact with the abradable seal section from one side in an axial direction, and a capturing part which forms a gap in at least at a part of the section between the abradable seal section and the seal housing section in order to capture any excess filling material.

9 Claims, 7 Drawing Sheets (51) Int. Cl.
*F02B 39/00* (2006.01)
*F16J 15/14* (2006.01)
*F16J 15/38* (2006.01)
*F04D 29/42* (2006.01)
*F01D 9/04* (2006.01)
*F02B 37/00* (2006.01)

(52) U.S. Cl.
CPC .......... *F04D 29/4206* (2013.01); *F16J 15/14* (2013.01); *F16J 15/38* (2013.01); *F01D 9/045* (2013.01); *F02B 37/00* (2013.01); *F05D 2220/40* (2013.01); *F05D 2230/23* (2013.01); *F05D 2230/64* (2013.01); *F05D 2300/432* (2013.01)

(58) Field of Classification Search
CPC ...... F02B 39/00; F02B 37/00; F05D 2220/40; F05D 2230/23; F05D 2300/432; F05D 2230/64
USPC ........................................................ 415/172
See application file for complete search history.

(56) References Cited

U.S. PATENT DOCUMENTS

| 2017/0114714 A1* | 4/2017 | Niwa .................... F02B 37/025 |
| 2017/0350408 A1* | 12/2017 | Sakurai .................. F02B 39/00 |
| 2018/0283394 A1 | 10/2018 | Miyoshi et al. |

FOREIGN PATENT DOCUMENTS

| JP | 2004324569 A | * | 11/2004 |
| JP | 3639846 B | | 4/2005 |
| JP | 2005-298042 A | | 10/2005 |
| JP | 2008-174791 A | | 7/2008 |
| JP | 2008174791 A | * | 7/2008 |
| JP | 2011-52558 A | | 3/2011 |
| JP | 2011-163239 A | | 8/2011 |
| JP | 2011-190705 A | | 9/2011 |
| JP | 2011190705 A | * | 9/2011 |
| JP | 2013-211337 A | | 10/2013 |
| JP | 5364834 B1 | | 12/2013 |
| JP | 2014-47714 A | | 3/2014 |
| JP | 2014-58917 A | | 4/2014 |
| JP | 2014-58918 A | | 4/2014 |
| JP | 2014-70628 A | | 4/2014 |
| JP | 2014-88785 A | | 5/2014 |
| JP | 5533060 B2 | | 6/2014 |
| JP | 2014-152614 A | | 8/2014 |
| JP | 5664785 B2 | | 2/2015 |
| WO | WO 98/48157 A1 | | 10/1998 |

OTHER PUBLICATIONS

JP-2004324569-A—English Translation (Year: 2003).*
JP-2008174791-A—English Translation (Year: 2007).*
International Search Report and Written Opinion of the International Searching Authority (Forms PCT/ISA/237 and PCT/ISA/210) for International Application No. PCT/JP2015/058854, dated Jun. 30, 2015, with English translations.

* cited by examiner

IMPELLER COVER, ROTARY MACHINE, AND IMPELLER COVER MANUFACTURING METHOD

TECHNICAL FIELD

The present invention relates to an impeller cover, a rotary machine, and an impeller cover manufacturing method.

BACKGROUND ART

These days, stringent exhaust gas- and fuel economy-related regulations are being implemented on internal combustion engines such as automobile engines. A turbocharger is an example of techniques adopted for fuel economy improvement and a reduction in the concentration of $CO_2$ in exhaust gas.

The turbocharger is a rotary machine rotating an impeller of a centrifugal compressor as a turbine is driven to rotate by exhaust gas from an engine. Air compressed by the rotation of the impeller is boosted in pressure by being decelerated by a diffuser and is supplied to the engine through a scroll flow path.

Effective in the interest of the efficiency of the turbocharger (turbocharging efficiency) is a minimized clearance between the impeller of the compressor and a housing covering the impeller. Fluid counterflow from a high pressure side to a low pressure side of the compressor can be increasingly suppressed as the clearance is reduced, and then the efficiency of the turbocharger as a whole is improved.

An abradable seal such as that disclosed in PTL 1 is practically used as a technique for reducing the clearance between the impeller and the housing as described above. The abradable seal is formed from a machinable material that is softer than the impeller because it might be brought into contact with the impeller. Preferred examples of the material include polytetrafluoroethylene (Teflon (registered trademark)). The abradable seal is obtained, with a desired shape and prior to attachment to the housing, by that type of resin material being injection-molded. PTL 1 discloses a configuration in which the abradable seal formed from Teflon (registered trademark) is press-fitted to a groove portion of the compressor housing and is fixed by a curable gasket. In the above-described device, press fitting for ensuring abradable seal attachment accuracy is performed at this time such that a surface (positioning surface) of the abradable seal becomes flush with a reference surface disposed on the housing side. As a result of the press fitting, abradable seal positioning accuracy in an axial direction of the turbocharger can be increased and post-processing (cutting processing) for the abradable seal can be omitted.

CITATION LIST

Patent Literature

[PTL 1] Japanese Unexamined Patent Application Publication No. 2011-190705

SUMMARY OF INVENTION

Technical Problem

With the technique that is disclosed in PTL 1, however, the flushing between the reference surface and the positioning surface is rarely maintained during the press fitting of the abradable seal in some cases depending on the amount by which the gasket is applied. In a case where an excessively large amount of the gasket is applied, in particular, a surplus of the gasket might leak out from a welding interface between the abradable seal and the housing. Once the gasket is hardened after leaking out, a sufficient clearance cannot be ensured between the impeller and the housing, and then a decline in the efficiency of the device ensues. As described above, the technique that is disclosed in PTL 1 has room for improvement.

The present invention has been made in view of the circumstances described above, and an object thereof is to provide an impeller cover that can be manufactured with ease, a method for manufacturing the impeller cover, and a rotary machine that is sufficient in terms of efficiency.

Solution to Problem

The present invention adopts the following means in order to solve the above problem. According to a first aspect of the present invention, an impeller cover includes a machinable abradable seal section having a shroud surface facing an outer peripheral surface of an impeller rotating about an axis and providing sealing between the outer peripheral surface and the shroud surface, a cover main body covering the impeller from an outside and having a seal housing section in which the abradable seal section is housed, and a filling material interposed between the abradable seal section and the cover main body, in which the seal housing section has a fitting inner peripheral surface extending along an axis for an outer peripheral surface of the abradable seal section to be fitted to the fitting inner peripheral surface and a reference surface positioning the abradable seal section in an axial direction by abutting against the abradable seal section from one side in the axial direction and the seal housing section has a capturing unit capturing a surplus of the filling material by forming a gap in at least a part of a space between the abradable seal section and the seal housing section.

According to the configuration described above, the surplus filling material is captured by the gap as the capturing unit, even in a case where an excessively large amount of the filling material has been applied, when the abradable seal section is fixed to the seal housing section. Accordingly, the abradable seal section can be fixed to the reference surface with a high level of accuracy.

According to a second aspect of the present invention, in the impeller cover according to the first aspect described above, the capturing unit may be a recessed groove formed in at least a part of an end face on the one side in the axial direction of the abradable seal section and radially extending about an axis.

According to the configuration described above, the surplus filling material can be captured inside the recessed groove. Since the capturing unit (recessed groove) is disposed in an end portion of the abradable seal section on the one side in the axial direction, the likelihood of flowing toward the fitting inner peripheral surface side of the seal housing section (outer peripheral surface side of the abradable seal section) can be reduced when the abradable seal section is press-fitted to the seal housing section. As a result, the positioning accuracy of the abradable seal section in the radial direction of the axis can be improved as well.

According to a third aspect of the present invention, in the impeller cover according to the first or second aspect described above, a first groove portion recessed radially outwards and extending in a peripheral direction may be formed in the fitting inner peripheral surface and a second groove portion extending in the peripheral direction in a region facing the first groove portion and having an axial dimension exceeding an axial dimension of the first groove portion may be formed in the outer peripheral surface of the abradable seal section.

According to the configuration described above, the filling material hardened in the second groove portion meshes with the first groove portion, and thus misalignment of the abradable seal section in the axial direction can be suppressed.

According to a fourth aspect of the present invention, in the impeller cover according to any one of the first to third aspects described above, the abradable seal section may also have a connection surface providing continuous connection between an end portion of the shroud surface on an outer side in a radial direction and an inner peripheral surface of the cover main body.

According to the configuration described above, the abradable seal section and the inner peripheral surface of the cover main body are continuously connected to each other by the connection surface. Accordingly, vortex generation or the like in the vicinity of the connection surface can be reduced and a surge flow rate of a fluid can be reduced when the impeller cover is used with a rotary machine.

According to a fifth aspect of the present invention, in the impeller cover according to any one of the first to fourth aspects described above, the abradable seal section may be formed from a resin material obtained by a fluororesin being defluoridated.

According to the configuration described above, the affinity of the abradable seal section with the filling material can be improved. In other words, the abradable seal section can be fixed to the impeller cover with a sufficient level of firmness.

According to a sixth aspect of the present invention, a rotary machine includes a rotary shaft extending along an axis, an impeller having a disk fixed to the rotary shaft and protruding radially outwards and a plurality of blades spaced apart from one another in a peripheral direction on a surface facing one side of the disk in an axial direction and forming a flow path extending radially outwards from the one side in the axial direction, and the impeller cover according to any one of the first to fifth aspects described above.

According to the configuration described above, the rotary machine can be provided with a sufficient level of efficiency.

According to a seventh aspect of the present invention, in the rotary machine according to the sixth aspect described above, the abradable seal section may be configured to cover a region equivalent to at least one-third of a dimension of the blade in a meridian direction from the one side in the axial direction.

According to the configuration described above, fluid counterflow in the vicinity of the blade can be sufficiently reduced. As a result, the rotary machine can be improved in terms of efficiency.

According to an eighth aspect of the present invention, an impeller cover manufacturing method is a method for manufacturing the impeller cover according to any one of the first to sixth aspects described above and includes a process of forming the shroud surface by processing the abradable seal section, a process of applying the filling material to the seal housing section, a process of fitting the abradable seal section to the seal housing section in a state where the filling material is interposed, and a process of press-fitting the abradable seal section from the other side in the axial direction.

According to this method, the processing of the shroud surface is performed before the abradable seal section is fitted and press-fitted to the seal housing section. In other words, the impeller cover can be assembled more easily than in a case where the shroud surface is processed in a state where the abradable seal section has been assembled with the cover main body. In a case where cutting processing is performed on the abradable seal section already assembled with the cover main body, in particular, the range of accessibility of a tool is limited, and thus sufficient processing accuracy might not be obtained. This likelihood, however, can be reduced by the method described above.

Advantageous Effects of Invention

The impeller cover, the rotary machine, and the impeller cover manufacturing method according to the present invention are capable of facilitating the manufacturing of a rotary machine that is sufficient in terms of efficiency and an impeller cover for the rotary machine.

DESCRIPTION OF EMBODIMENTS

First Embodiment

A first embodiment of the present invention will be described with reference to accompanying drawings.

Figure 1:
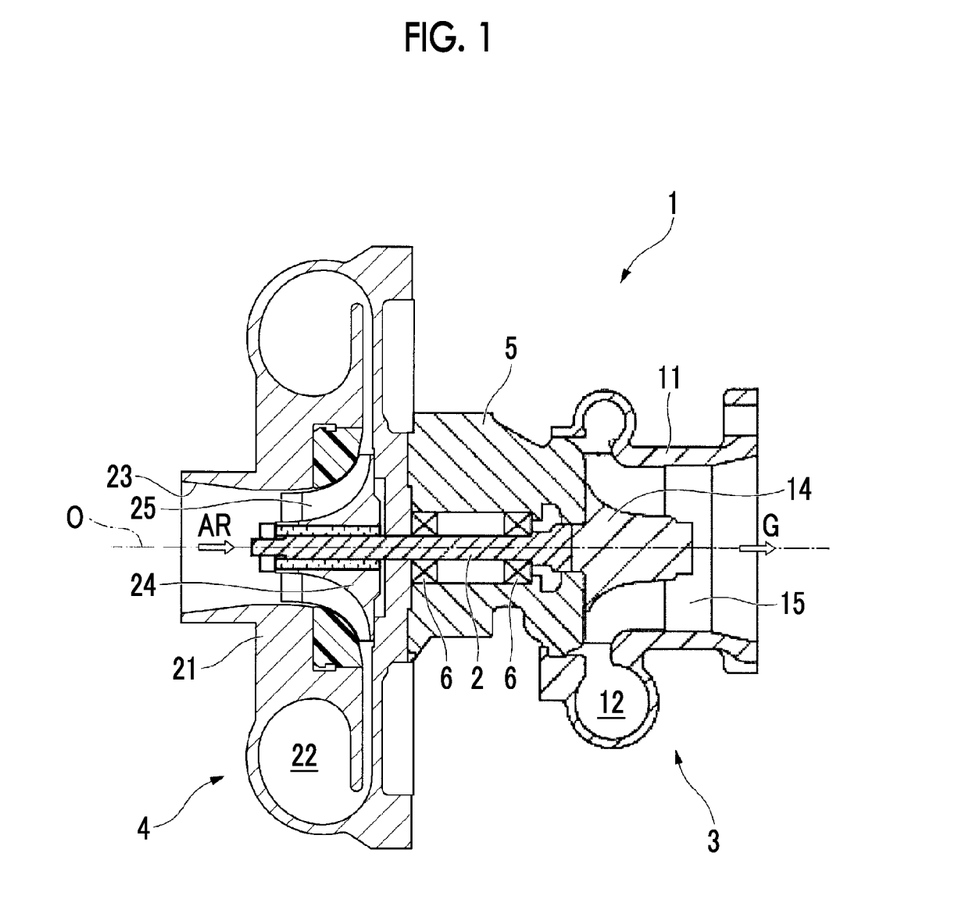
FIG. 1 is a diagram illustrating an impeller cover and a rotary machine according to a first embodiment of the present invention.

Hereinafter, a turbocharger 1 (rotary machine) according to the embodiment of the present invention will be described. As illustrated in FIG. 1, the turbocharger 1 is provided with a rotary shaft 2, a turbine 3 and a compressor 4 rotating with the rotary shaft 2, and a housing connection portion 5 connecting the turbine 3 and the compressor 4 to each other and supporting the rotary shaft 2. In this turbocharger 1, the turbine 3 is rotated by exhaust gas G from an engine (not illustrated). As a result of this rotation, the compressor 4 supplies compressed air AR to the engine.

The rotary shaft 2 extends in the direction of an axis O and rotates about the axis O. The turbine 3 is placed on one side in the direction of the axis O (right side in FIG. 1). This turbine 3 is provided with a turbine impeller 14 that has a turbine blade 15 and a turbine housing 11 that covers the turbine impeller 14 from an outer peripheral side. The rotary shaft 2 is attached to the turbine impeller 14.

The rotary shaft 2 is fitted to the turbine impeller 14, and the turbine impeller 14 is capable of rotating with the rotary shaft 2 about the axis O.

The turbine housing 11 covers the turbine impeller 14. A scroll passage 12 is formed in the turbine housing 11. The scroll passage 12 extends radially outwards from a leading edge portion of the turbine blade 15 (end portion on an outer side in a radial direction), has the shape of a ring about the axis O at a position on the outer side in the radial direction, and allows the inside and outside of the turbine housing 11 to communicate with each other. The turbine impeller 14 and the rotary shaft 2 are rotated by the exhaust gas G being introduced to the turbine impeller 14 from the scroll passage 12.

A discharge port 13, which is open on one side of the axis O, is also formed in the turbine housing 11. The exhaust gas G that has passed through the turbine blade 15 flows toward the one side of the axis O and is discharged to the outside of the turbine housing 11 from the discharge port 13.

The compressor 4 is placed on the other side in the direction of the axis O (left side in FIG. 1). The compressor 4 is provided with a compressor impeller 24 (impeller 24) that has a compressor blade 25 (blade 25) and a compressor housing 21 (impeller cover 21) that covers the compressor impeller 24 from an outer peripheral side. The rotary shaft 2 is attached to the compressor impeller 24. More specifically, the compressor impeller 24 has a disk-shaped disk that protrudes to the outside in the radial direction of the axis O from an outer peripheral surface of the rotary shaft 2. The compressor impeller 24 has a radial shape about the axis O on a surface of the disk on the side in the direction of the axis O and is arranged with a gap in a peripheral direction. The rotary shaft 2 is fitted to the compressor impeller 24, and the compressor impeller 24 is capable of rotating with the rotary shaft 2 about the axis O.

The compressor housing 21 covers the compressor impeller 24. A suction port 23, which is open on the other side of the axis O, is formed in the compressor housing 21. The air AR is introduced to the compressor impeller 24 from the outside of the compressor housing 21 through this suction port 23. The compressor impeller 24 rotates about the axis O and the air AR is compressed by a rotational force from the turbine impeller 14 being transmitted to the compressor impeller 24 via the rotary shaft 2.

A compressor passage 22 is formed in the compressor housing 21. The compressor passage 22 extends radially outwards from a trailing edge portion of the compressor blade 25 (downstream end portion of the flow of the air AR), has the shape of a ring about the axis O at a position on the outer side of the radial direction, and allows the inside and outside of the compressor housing 21 to communicate with each other. The air AR compressed by the compressor impeller 24 is introduced to the compressor passage 22 and ejected to the outside of the compressor housing 21.

The housing connection portion 5 is placed between the compressor housing 21 and the turbine housing 11 and connects the compressor housing 21 and the turbine housing to each other. In addition, the housing connection portion 5 covers the rotary shaft 2 from an outer peripheral side. Bearings 6 are disposed in the housing connection portion 5. The rotary shaft 2 is supported by the bearings 6 such that the rotary shaft 2 is capable of rotating relative to the housing connection portion 5.

Figure 2:
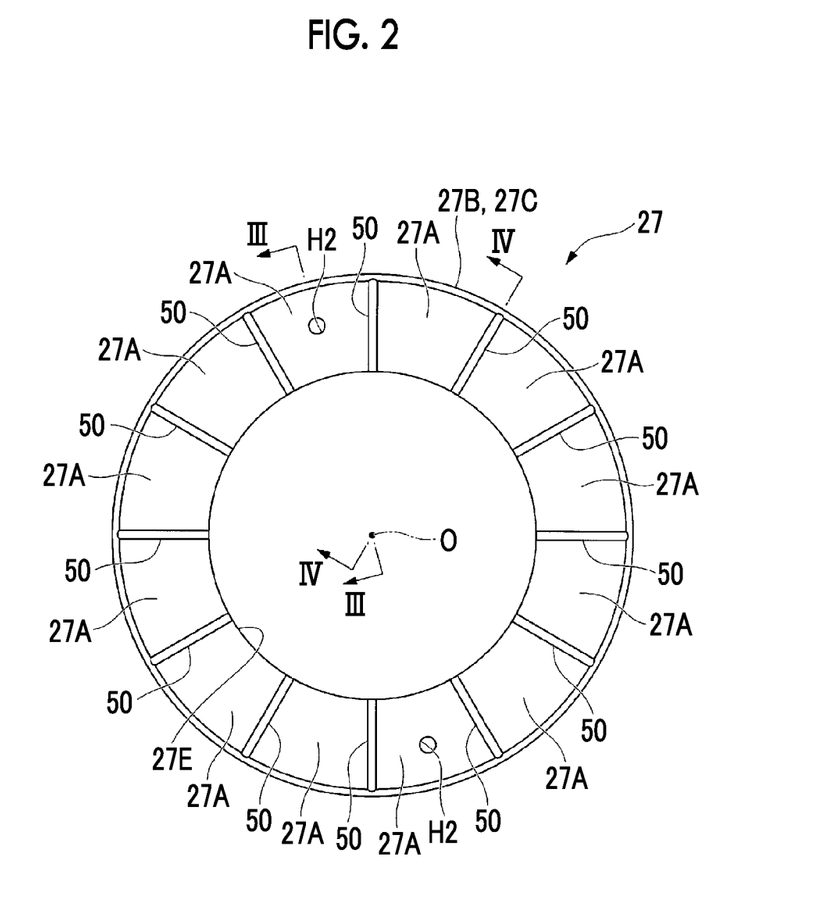
FIG. 2 is a diagram in which an abradable seal section according to the first embodiment of the present invention is seen from an axial direction.
Figure 3:
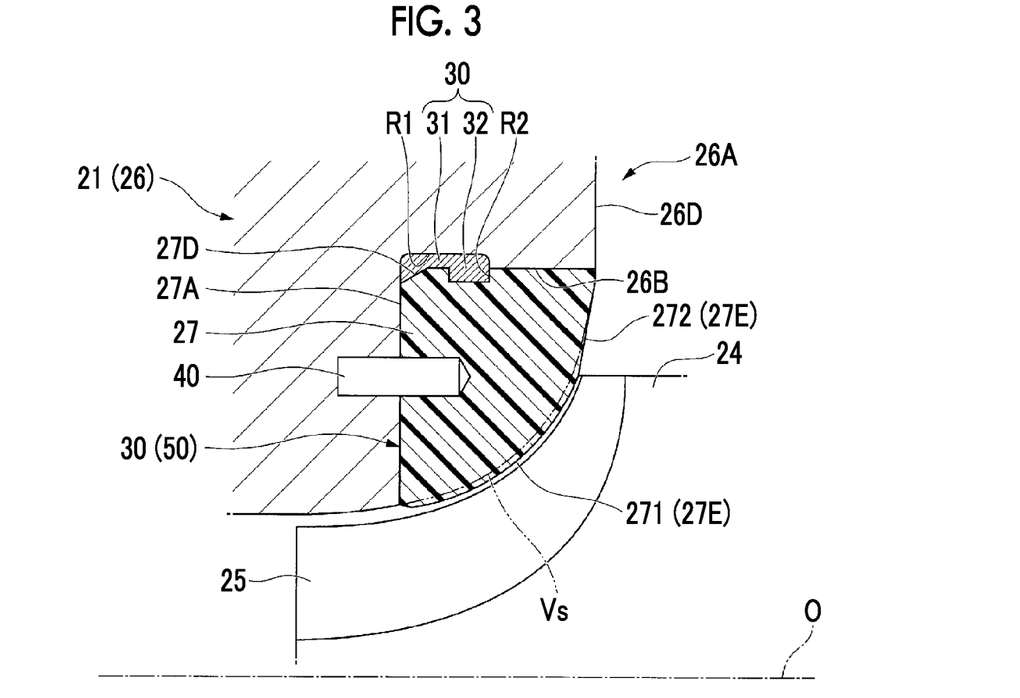
FIG. 3 is an enlarged view of a main portion of the impeller cover according to the first embodiment of the present invention, which is a sectional view taken along line III-III of FIG. 2.

A detailed configuration of the compressor housing 21 will be described below. As illustrated in FIGS. 2 and 3, the compressor housing 21 according to the present embodiment has a housing main body (cover main body 26) constituting the outer shape of the compressor housing 21, an abradable seal section 27 fixed to the housing main body, and a filling material 30 interposed between the cover main body 26 and the abradable seal section 27.

A seal housing section 26A housing the abradable seal section 27 is formed in the cover main body 26. The seal housing section 26A is a recessed portion that is formed on an inner peripheral side of the cover main body 26 and has a substantially annular shape when viewed from the other side in the direction of the axis O. An inner peripheral surface of the seal housing section 26A (that is, a surface on the outer side of the radial direction of the axis O) is a fitting inner peripheral surface 26B. A surface of the seal housing section 26A on the side in the direction of the axis O is a reference surface 26C for positioning the abradable seal section 27 (described later) in the direction of the axis O.

The fitting inner peripheral surface 26B extends substantially in parallel to the axis O and has a substantially circular cross section when viewed from the direction of the axis O. The reference surface 26C is a substantially circular surface that spreads in the direction which is orthogonal to the axis O. The reference surface 26C does not have to be completely orthogonal to the axis O. An error or the like is allowed to some extent insofar as it is substantially orthogonal thereto.

A surface that is positioned on the outer side of the seal housing section 26A in the radial direction based on the axis O as a reference (that is, a surface on an outer peripheral side of the seal housing section 26A) constitutes a vertical surface 26D by extending into a plane substantially orthogonal to the axis O. A surface that is positioned on the inner side of the seal housing section 26A in the radial direction (that is, a surface positioned inside the seal housing section 26A in the radial direction) constitutes a part of a flow path inner wall communicating with the suction port 23 described above.

In the present embodiment, a first groove portion R1, which is recessed radially outwards from the axis O, is formed in a region of the fitting inner peripheral surface 26B on the side in the direction of the axis O. The first groove portion R1 extends in the peripheral direction of the axis O on the fitting inner peripheral surface 26B. The first groove portion R1 has a substantially rectangular cross section when viewed from the peripheral direction of the axis O.

A plurality of holes (first hole portion H1) is formed on the reference surface 26C of the seal housing section 26A. As illustrated in FIG. 3, a positioning pin for positioning the abradable seal section 27 in the peripheral direction is inserted into the first hole portion H1.

The abradable seal section 27 is, for example, a member that is integrally formed from a fluororesin such as polytetrafluoroethylene (PTFE). Accordingly, the abradable seal section 27 is lower in hardness than a material constituting the compressor blade 25. In a case where a tip portion of the blade 25 is in contact with the abradable seal section 27, for example, the abradable seal section 27 is cut by the tip portion. In other words, the likelihood of wear and bending of the tip portion is reduced.

A gap (clearance) between the abradable seal section 27 and the tip portion of the blade 25 becomes extremely narrow through the cutting described above. As a result, the abradable seal section 27 seals the leakage and counterflow of a fluid (air AR) between the blade 25 and itself.

The abradable seal section 27 is formed in a substantially annular shape (refer to FIG. 2) by the resin material described above undergoing injection molding or cutting processing. In addition, the abradable seal section 27 is bonded and fixed via the filling material 30 in the seal housing section 26A. The filling material 30 is a liquid material that is capable of bonding the resinous abradable seal section 27 and the cover main body 26 (metal material) to each other. The seal housing section 26A and the abradable seal section 27 are fixed to each other by a space between the seal housing section 26A and the abradable seal section 27 being filled with the filling material 30 and then the filling material 30 being hardened, which will be described in detail later.

Figure 4:
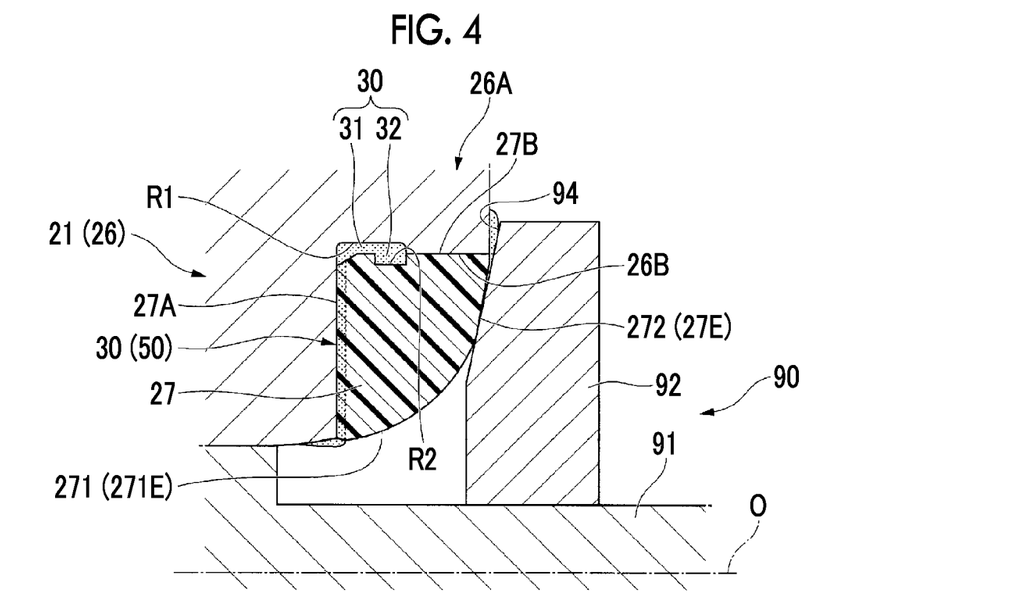
FIG. 4 is an enlarged view of the main portion of the impeller cover according to the first embodiment of the present invention, which is a sectional view taken along line IV-IV of FIG. 2.

Illustrated in FIGS. 3 and 4 is a state where the abradable seal section 27 has been fixed to the seal housing section 26A (state where the abradable seal section 27 is already assembled in the seal housing section 26A). In other words, the central axis O of the abradable seal section 27 is substantially coaxial with the axis O of the cover main body 26 (turbocharger 1) in this state following the assembly. In this state following the assembly, a surface facing the reference surface 26C of the seal housing section 26A (that is, an end face on the side in the direction of the axis O) constitutes an abutting surface 27A by being formed such that it is substantially parallel to the reference surface 26C of the seal housing section 26A. As illustrated in FIG. 2, a plurality of recessed grooves (capturing unit 50) radially extending about the axis O is formed in the abutting surface 27A. More specifically, 12 recessed grooves (capturing unit 50) are spaced apart from one another in the peripheral direction of the axis O in the example that is illustrated in FIG. 2. When the abradable seal section 27 is housed in the seal housing section 26A, openings of these recessed grooves (openings on the side in the direction of the axis O) are blocked by the reference surface 26C. Accordingly, gaps are formed between the reference surface 26C and themselves. A surplus of the filling material 30 is captured by the gaps and exudation to another region is suppressed because of the presence of the gaps, which will be described in detail later.

A plurality of (two) holes (second hole portion H2), which is recessed toward the other side in the direction of the axis O from the abutting surface 27A, is also formed in the abradable seal section 27 according to the present embodiment. The second hole portions H2 are disposed at positions respectively corresponding in the peripheral direction and the radial direction of the axis O to the first hole portions H1 formed on the reference surface 26C of the seal housing section 26A. Accordingly, the half of the positioning pin 40 that is on the side in the direction of the axis O is inserted into the first hole portion H1, and the other half of the positioning pin 40 that is on the other side in the direction of the axis O is inserted into the second hole portion H2.

As illustrated in FIG. 2, the second hole portion H2 is formed in a region between a pair of the capturing units 50 adjacent to each other in the peripheral direction on the abutting surface 27A. The two hole portions are respectively formed at positions separated from each other in the radial direction across the axis O. The first hole portions H1 (holes on the seal housing section 26A side) are respectively formed at positions corresponding to the second hole portions H2 as well.

As illustrated in FIG. 3, a second groove portion R2, which is recessed toward the inner side in the radial direction, is formed in a region of an outer peripheral surface of the abradable seal section 27 that is on the side in the direction of the axis O. The second groove portion R2 has a substantially rectangular cross section when viewed from the peripheral direction of the axis O. The dimension of the second groove portion R2 in the direction of the axis O is set such that it falls short of that of the first groove portion R1. More specifically, with the abradable seal section 27 housed in the seal housing section 26A, the second groove portion R2 is formed at a position superposed on the region on the other side in the direction of the axis O with respect to the first groove portion R1 when viewed from the radial direction of the axis O. In particular, inner wall surfaces of the first groove portion R1 and the second groove portion R2 on the other side in the direction of the axis O are flush with each other in the direction of the axis O.

A region of the outer peripheral surface of the abradable seal section 27 that extends beyond the second groove portion R2 on the other side in the direction of the axis O constitutes an inlay portion 27B by extending substantially in parallel to the direction of the axis O. The radial dimension (outer diameter dimension) of the inlay portion 27B is substantially equal to the inner diameter dimension of the fitting inner peripheral surface 26B of the seal housing section 26A. As a result, the inlay portion 27B abuts against the fitting inner peripheral surface 26B substantially without a gap.

A region (insertion portion 27C) of the outer peripheral surface of the abradable seal section 27 that extends beyond the second groove portion R2 on the side in the direction of the axis O has a radial dimension that is slightly smaller than that of the inlay portion 27B. As a result, a slight gap is formed between the insertion portion 27C and the fitting inner peripheral surface 26B when the abradable seal section 27 is inserted into the seal housing section 26A. An end portion of the insertion portion 27C that is on the side in the direction of the axis O constitutes a tapered surface 27D by being chamfered such that it is inclined with respect to the axis O.

Figure 5:
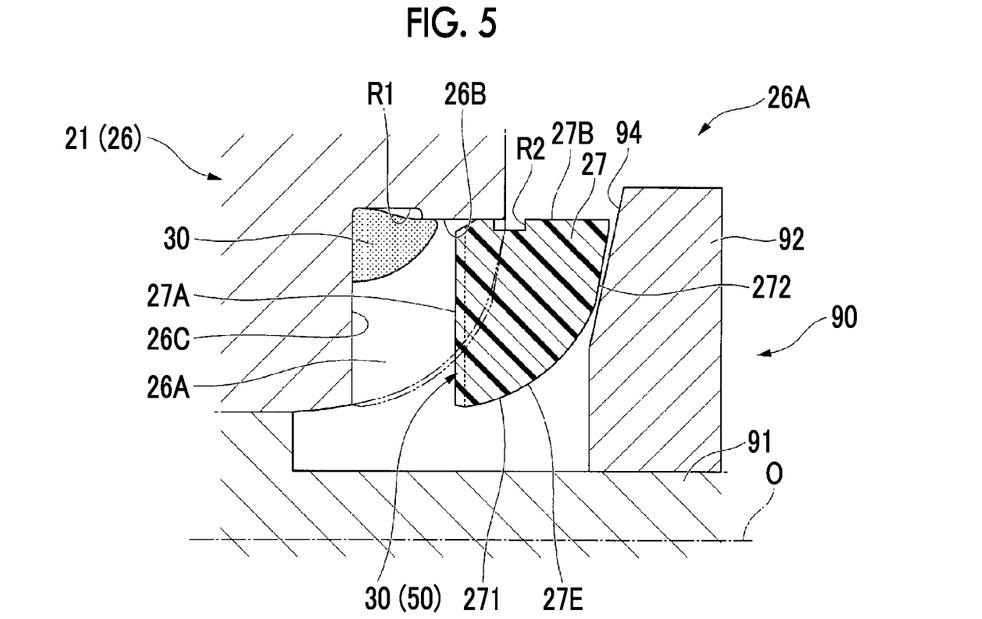
FIG. 5 is a diagram illustrating a state where the impeller cover according to the first embodiment of the present invention is yet to be assembled.

As illustrated in FIGS. 3 to 5, a surface (flow path surface 27E) of the abradable seal section 27 on the other side in the direction of the axis O has a shroud surface 271 that has the shape of a curved surface and a connection surface 272 that is continuous to the shroud surface 271.

The shroud surface 271 is a surface forming a region of the flow path surface 27E that is on the side in the direction of the axis O. From the side toward the other side of the axis O, the shroud surface 271 is curved radially outwards from the inner side in the radial direction. In a state where the shroud surface 271 has been incorporated into the cover main body 26, the shroud surface 271 faces the tip portion of the compressor blade 25 at a gap distance of approximately 0.1 mm. In other words, the shroud surface 271 has a shape corresponding to the shape of a tip portion of the impeller 24 when viewed from the peripheral direction of the axis O. The dashed lines inside the shroud surface 271 illustrated in the drawings represent a shroud reference plane Vs. The shroud reference plane Vs is a virtual plane flush with the vertical surface 26D of the cover main body 26 and an inlet side inner peripheral surface of the cover main body (inner peripheral surface on the side in the direction of the axis O). The shroud reference plane Vs extends along the tip portion of the blade 25 at a position that is at a distance of approximately 0.3 mm from the compressor blade 25. In other words, the shroud surface 271 protrudes by approximately 0.2 mm to the tip portion side from the shroud reference plane Vs.

The connection surface 272 of the flow path surface 27E, which is positioned beyond the shroud surface 271 on the other side in the direction of the axis O, extends in a substantially linear shape when viewed from the peripheral direction of the axis O. More specifically, from the side toward the other side of the axis O, the connection surface 272 is inclined outwards from the inner side in the radial direction. With the abradable seal section 27 housed in the seal housing section 26A, an end portion of the connection surface 272 on the outer side in the radial direction is continuously connected to the vertical surface 26D (described above) of the cover main body 26. In other words, the connection surface 272 and the vertical surface 26D are flush with each other such that no step or deviation is substantially present between themselves.

It is desirable that the shape of the flow path surface 27E, the shape of the shroud surface 271 in particular, is formed in advance by cutting processing, polishing, or the like before the assembly of the abradable seal section 27 with respect to the cover main body 26. In doing so, a higher level of workability can be obtained, with tool and jig accessibility ensured, than in a case where similar processing such as cutting and polishing is conducted with the abradable seal section 27 assembled with respect to the cover main body 26.

The abradable seal section 27 according to the present embodiment is configured to cover a region equivalent to at least one-third of the dimension of the compressor blade 25 in a meridian direction from the side in the direction of the axis O in the state where the abradable seal section 27 is housed in the seal housing section 26A (refer to FIG. 3). In addition, a connection portion of the abradable seal section 27 extends radially outwards beyond an outlet side of the compressor blade 25 (end portion on the outer side in the radial direction).

The abradable seal section 27 that has the configuration described above is fixed in the seal housing section 26A by the filling material 30. Main examples of the filling material 30 include silicone-based and acrylic adhesives. These adhesives have a relatively high viscosity and are hardened over a certain period of time. Those that rarely shrink in volume despite the hardening are particularly suitable as the adhesives. In a case where such adhesives are used, it is desirable that the abradable seal section 27 is defluoridated. The polytetrafluoroethylene that forms the abradable seal section 27 is excellent in terms of machinability and has a fluorine coating, and thus lacks affinity with the adhesive (filling material 30). Once the defluoridation treatment is performed, however, a fluorine component is removed from an extreme surface layer of the abradable seal section 27 and its affinity with the adhesive is improved (bonding strength is improved).

In the state following the assembly, the region that is illustrated in FIG. 3 or 4 is filled with the filling material 30. As illustrated in FIG. 3, the inside of the first groove portion R1 of the seal housing section 26A is filled with the filling material 30 substantially without a gap. In addition, the inside of the second groove portion R2 of the abradable seal section 27 is filled with the filling material 30 substantially without a gap. As a result, the hardened filling material 30 has a hook shape inside the first groove portion R1 and the second groove portion R2. More specifically, a part (first hardened portion 31) surrounded in the radial direction between the insertion portion 27C of the abradable seal section 27 and an inner peripheral surface (bottom surface) of the second groove portion R2 and a part (second hardened portion 32) surrounded in the radial direction by bottom surfaces of the first groove portion R1 and the second groove portion R2 are formed. This results in a state where the second hardened portion 32 is engaged with the second groove portion R2 of the abradable seal section 27 from the outer side in the radial direction.

In addition, the filling material 30 is slightly interposed between the reference surface 26C of the seal housing section 26A and the abutting surface 27A of the abradable seal section 27. The filling material 30 thinly spreads because of the pressure that is applied between the abutting surface 27A and the reference surface 26C when the abradable seal section 27 is press-fitted to the seal housing section 26A and the filling material 30 shows the shape of a thin film and spreads in the radial direction of the axis O and substantially without a gap after being hardened, which will be described in detail later.

As illustrated in FIG. 4, the surplus filling material 30 pushed by the abutting surface 27A flows into the recessed groove as the capturing unit 50 in the abutting surface 27A of the abradable seal section 27. This recessed groove is filled with the filling material 30 substantially without a gap, too.

Hereinafter, a method for assembling the impeller cover 21 described above (method for manufacturing the impeller cover 21) will be described with reference to FIGS. 4, 5, and 10. Firstly, the unhardened (liquid) filling material 30 is applied to the inside of the seal housing section 26A as illustrated in FIG. 5. More specifically, the filling material 30 is applied to a corner portion that is formed by the reference surface 26C and the fitting inner peripheral surface 26B (second groove portion R2) of the seal housing section 26A with substantial uniformity and across the whole area in the peripheral direction. Since the viscosity of the filling material 30 is relatively high as described above, it does not flow immediately after the application and is held in the corner portion for a certain period of time.

Subsequently, the abradable seal section 27 is placed on the other side of the cover main body 26 in the direction of the axis O, with shape processing for the flow path surface 27E (shroud surface 271, connection surface 272) completed, as illustrated in FIG. 5. At this time, it is preferable that a jig (press fitting jig 90) illustrated in the same drawing is used. This press fitting jig 90 has a center pin 91 extending in a columnar shape along a linear central axis and a press fitting ring slidable in the direction of the central axis on an outer peripheral side of the center pin 91. An end portion of the center pin 91 on one side in the direction of the central axis constitutes a flange portion 93 by expanding radially outwards in diameter. The outer diameter dimension of the flange portion 93 is slightly smaller than or substantially equal to the inner diameter dimension of the cover main body 26 on the side in the direction of the axis O.

The press fitting ring 92 has the shape of an annular plate spreading radially outwards from the central axis of the center pin 91. A tapered portion 94 is formed on one of two central axial surfaces of the press fitting ring 92 that is on the side in particular (that is, a surface on its side facing the cover main body 26 side during the assembly). Radially inwards from an end face of the press fitting ring 92 that is on the outer side in the radial direction, the tapered portion 94 extends from the other side to the side in the direction of the central axis, and thus it is inclined with respect to the radial direction of the central axis. The tapered portion 94, in particular, is formed such that it is substantially parallel to the connection surface 272 of the abradable seal section 27 in a state where the press fitting jig 90 abuts against the abradable seal section 27. A hole is formed in a central portion of the press fitting ring 92, and this hole has an inner diameter dimension that is substantially equal to the outer shape dimension of the center pin 91. As a result, the press fitting ring 92 is freely slidable in the direction of the central axis with respect to the center pin 91.

During the assembly, the abradable seal section 27 is press-fitted to the seal housing section 26A by the press fitting ring 92 being moved toward the side in the direction of the axis O in a state where the tapered portion 94 of the press fitting ring 92 abuts against the connection surface 272 of the abradable seal section 27. As described above, the outer diameter dimension of the insertion portion 27C of the abradable seal section 27 is slightly smaller than the inner diameter dimension of the fitting inner peripheral surface 26B of the seal housing section 26A and the tapered portion 94 is formed on the side in the direction of the axis O. Accordingly, in the early stage of the press fitting, the abradable seal section 27 is inserted into the seal housing section 26A substantially without resistance.

The abradable seal section 27 is inserted on the side in the direction of the axis O once the press fitting ring 92 is further moved to the side in the direction of the axis O from the above-described state (that is, the state where the insertion portion 27C has been inserted into the fitting inner peripheral surface 26B). As a result, the abutting surface 27A of the abradable seal section 27 comes into contact with the filling material 30 applied to the corner portion of the seal housing section 26A.

The state that is illustrated in FIG. 4 is reached by the press fitting being further conducted. In other words, a state is reached where the abutting surface 27A on the press fitting ring 92 and the capturing unit 50 are parallel to the reference surface 26C in the seal housing section 26A. At this time, some the filling material 30 is hardened after flowing into the space that is formed by the first groove portion R1 and the second groove portion R2. The first hardened portion 31 and the second hardened portion 32 are formed as a result of the hardening.

The surplus filling material 30 not contained in the first hardened portion 31 and the second hardened portion 32 is extruded to the side in the direction of the axis O through the tapered portion 94 in the insertion portion 27C. The extruded surplus filling material 30 spreads along the reference surface 26C on the abutting surface 27A side of the abradable seal section 27. This filling material 30 is interposed in a thin film shape between the abutting surface 27A and the reference surface 26C. On the other hand, the filling material 30 extruded from the space between the abutting surface 27A and the reference surface 26C is guided into the capturing unit 50 (recessed groove). In a case where the surplus filling material 30 has been generated to an even larger extent, it slightly flows out radially inwards from the capturing unit 50.

The abradable seal section 27 is fixed to the cover main body 26 (inside of the seal housing section 26A) once the process described above is completed and the filling material 30 is hardened.

According to the configuration described above, the surplus filling material 30 is captured by the gap as the capturing unit 50, even in a case where an excessively large amount of the filling material 30 has been applied, when the abradable seal section 27 is fixed to the seal housing section 26A. Accordingly, the abradable seal section 27 can be fixed to the reference surface 26C with a high level of accuracy.

According to the configuration described above, the recessed groove as the capturing unit 50 is radially formed in at least a part of the abutting surface 27A of the abradable seal section 27.

Accordingly, the surplus filling material 30 generated between the abutting surface 27A and the reference surface 26C can be captured inside the recessed groove. Since the capturing unit 50 (recessed groove) is disposed in an end portion of the abradable seal section on the side in the direction of the axis O, the likelihood of flowing toward the fitting inner peripheral surface 26B side of the seal housing section 26A (outer peripheral surface side of the abradable seal section 27) can be reduced when the abradable seal section 27 is press-fitted to the seal housing section 26A. As a result, the positioning accuracy of the abradable seal section 27 in the radial direction of the axis O can be improved as well.

The first groove portion R1 is formed in the fitting inner peripheral surface 26B of the seal housing section 26A, and the second groove portion R2 facing the first groove portion R1 is formed in the outer peripheral surface of the abradable seal section 27.

Accordingly, the filling materials 30 hardened in the first groove portion R1 and the second groove portion R2 form the first hardened portion 31 and second hardened portion 32, respectively. The second hardened portion 32, which is one of the two, is engaged with a side surface of the second groove portion R2 on the side in the direction of the axis O from the direction of the axis O. As a result, the likelihood of misalignment or dropping of the abradable seal section 27 in the direction of the axis O with respect to the seal housing section 26A can be reduced even in a case where, for example, an external force directed toward the other side from the side in the direction of the axis O has been applied to the abradable seal section 27.

As described above, the connection surface 272 is formed on the flow path surface 27E of the abradable seal section 27, and the connection surface 272 provides continuous connection between an end portion of the shroud surface 271 on the outer side in the radial direction and the inner peripheral surface of the cover main body 26.

According to the configuration described above, the abradable seal section 27 and the inner peripheral surface of the cover main body 26 are continuously connected to each other by the connection surface 272. Accordingly, vortex generation or the like in the vicinity of the connection surface 272 can be reduced and a surge flow rate of the fluid can be reduced when the impeller cover 21 is used with the turbocharger 1.

The abradable seal section 27 is formed from the resin material obtained by the fluororesin being defluoridated. Accordingly, the affinity of the abradable seal section 27 with the filling material 30 can be improved. In other words, the abradable seal section 27 can be fixed to the impeller cover 21 (cover main body 26) with a sufficient level of firmness.

According to the configuration described above, the abradable seal section 27 is configured to cover the region equivalent to at least one-third of the dimension of the compressor blade 25 in the meridian direction from the side in the direction of the axis O.

Accordingly, fluid counterflow in the vicinity of the compressor blade 25 can be sufficiently reduced. As a result, the turbocharger 1 can be improved in terms of turbocharging efficiency.

Figure 10:
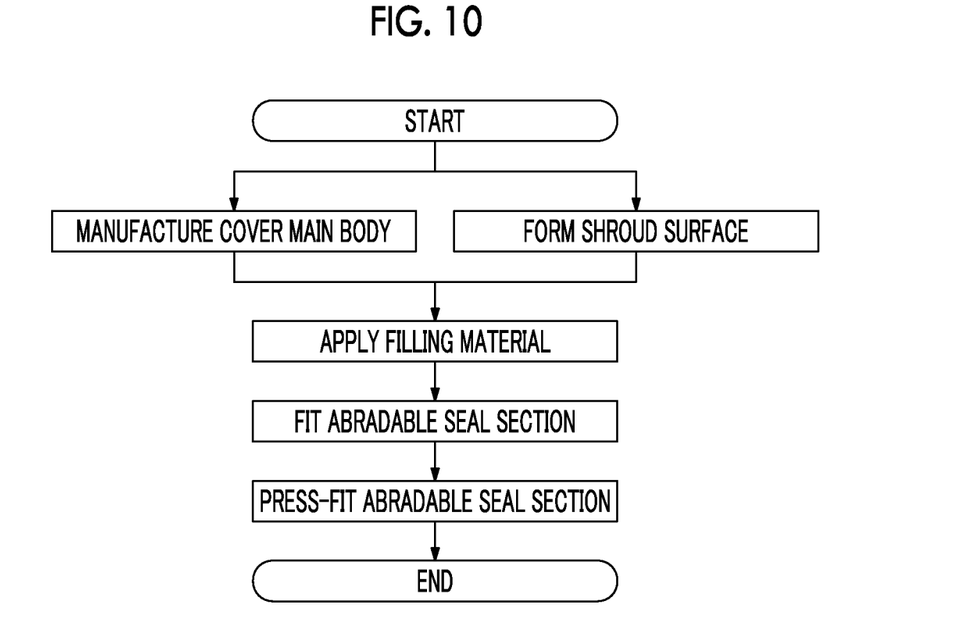
FIG. 10 is a process chart illustrating an example of an impeller cover manufacturing method according to an embodiment of the present invention.

The method for manufacturing the impeller cover 21 described above includes a process of forming the shroud surface 271 by processing the abradable seal section 27, a process of applying the filling material 30 to the seal housing section 26A, a process of fitting the abradable seal section 27 to the seal housing section 26A in a state where the filling material 30 is interposed, and a process of press-fitting the abradable seal section 27 from the other side in the direction of the axis O (FIG. 10).

According to this method, the processing of the shroud surface 271 is performed before the abradable seal section 27 is fitted and press-fitted to the seal housing section 26A. In other words, the impeller cover 21 can be assembled more easily than in a case where the shroud surface 271 is processed in a state where the abradable seal section 27 has been assembled with the cover main body 26.

In a case where cutting processing is performed on the abradable seal section 27 already assembled with the cover main body 26, in particular, the range of accessibility of a tool is limited, and thus sufficient processing accuracy might not be obtained. This likelihood, however, can be reduced by the method described above.

Misalignment of the abradable seal section 27 in the peripheral direction of the axis O is restricted by the positioning pin 40 inserted into the first hole portion H1 formed on the seal housing section 26A side and the second hole portion H2 formed in the abradable seal section 27 itself. In a case where the tip portion of the compressor blade 25 is in contact with the shroud surface 271 of the abradable seal section 27, in particular, it can be assumed that an external force is applied toward a front side in a rotation direction of the compressor impeller 24 with the abradable seal section 27 gradually cut. According to the configuration described above, the misalignment in the peripheral direction (that is, turning of the abradable seal section 27) can still be restricted by the presence of the positioning pin 40 even in a case where the external force in the peripheral direction has been applied.

In a case where the press fitting jig 90 described above is used, the region where the press fitting ring 92 and the abradable seal section 27 are in contact with each other is limited to the tapered portion 94 alone as illustrated in FIG. 4. In other words, the tapered portion 94 of the press fitting ring 92 and the connection portion of the abradable seal section 27 are in contact with each other. Accordingly, the surplus filling material 30 is not interposed in the region where the press fitting ring 92 and the abradable seal section 27 are in contact with each other even in a case where some of the filling material 30 has been exuded to the other side in the direction of the axis O through the fitting inner peripheral surface 26B as illustrated in the same drawing. As a result, misalignment in the direction of the axis O that is attributable to interposition of the filling material 30 between the press fitting jig 90 and the abradable seal section 27 can be suppressed during the press fitting of the abradable seal section 27 to the seal housing section 26A.

The embodiment of the present invention has been described above with reference to the accompanying drawings. However, what has been described above is merely an example, and it can be appropriately changed and improved depending on design and specifications.

In the first embodiment described above, an example has been described in which the plurality of recessed grooves formed on the abutting surface 27A of the abradable seal section 27 is adopted as the capturing unit 50. However, the configuration of the capturing unit 50 is not limited to the description. The configuration that is illustrated in FIGS. 6 and 7 can also be adopted as another example.

Figure 6:
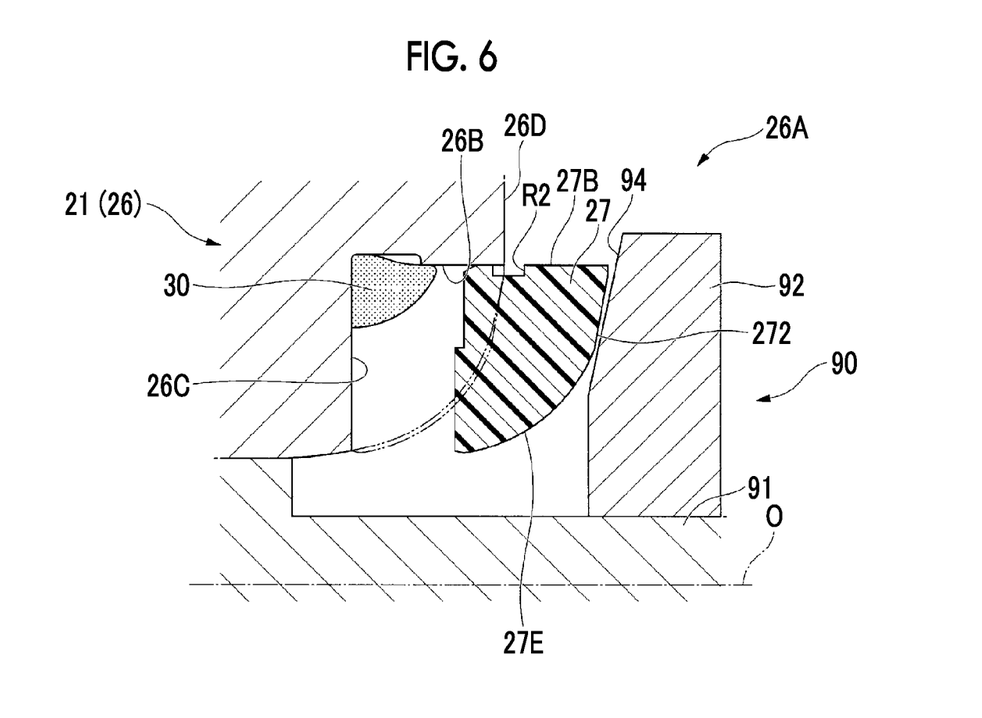
FIG. 6 is a diagram illustrating a state where an impeller cover according to a second embodiment of the present invention is yet to be assembled.
Figure 7:
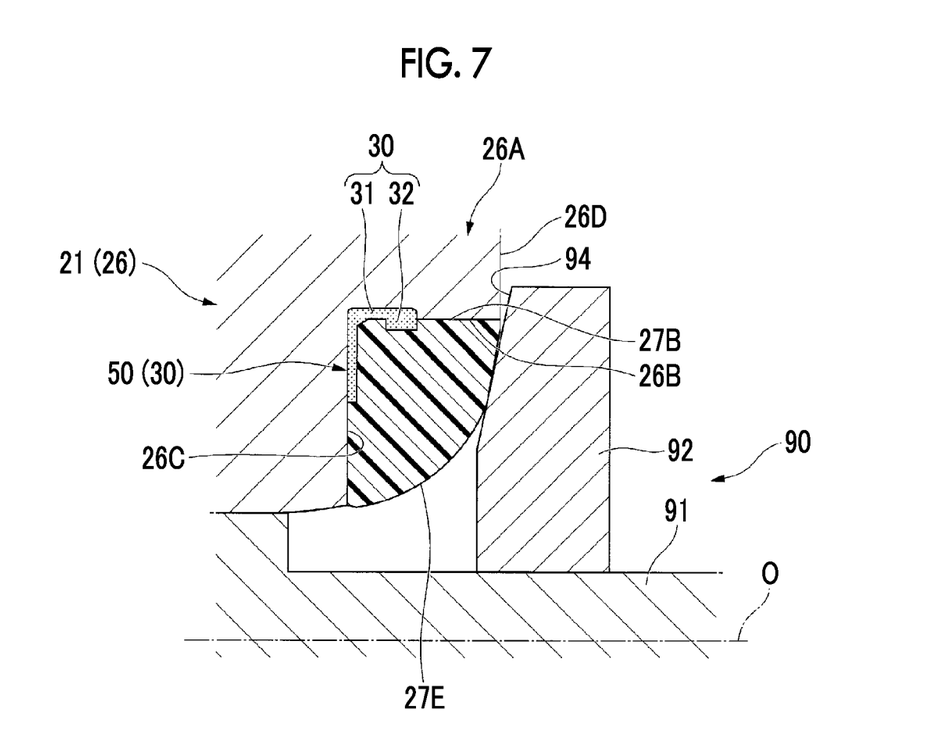
FIG. 7 is a diagram illustrating a state following the assembly of the impeller cover according to the second embodiment of the present invention.

In the example that is illustrated in FIG. 6, a recessed groove is formed in a partial region of the abutting surface 27A of the abradable seal section 27 that is on the outer side in the radial direction. In a case where this recessed groove is used as the capturing unit 50, the surplus filling material 30 is contained in the recessed groove on the outer side of the abutting surface 27A in the radial direction in the abradable seal section 27 in the state following the assembly. In other words, even in a case where the surplus filling material 30 has been generated, the likelihood of leaching of the filling material 30 from the abutting surface 27A toward the inner side of the abradable seal section 27 in the radial direction can be reduced.

Figure 8:
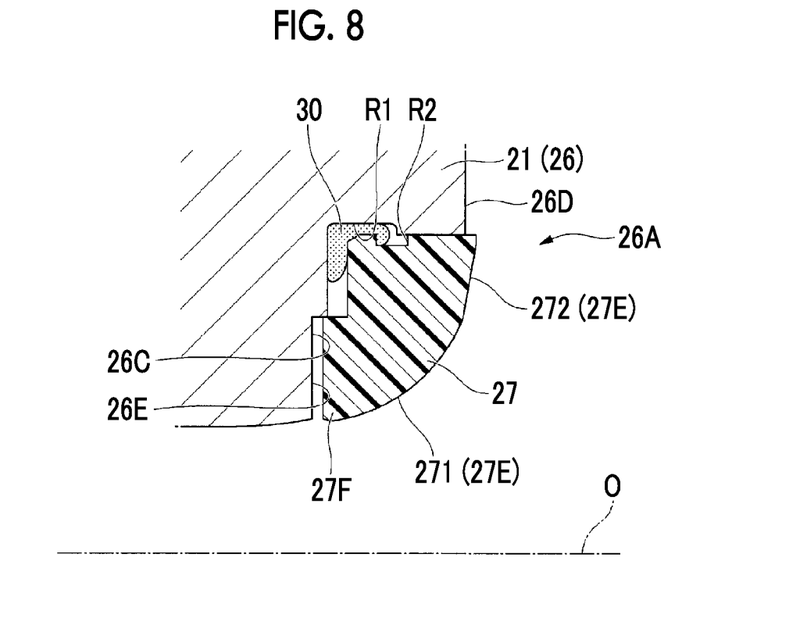
FIG. 8 is a diagram illustrating a state where an impeller cover according to a third embodiment of the present invention is yet to be assembled.
Figure 9:
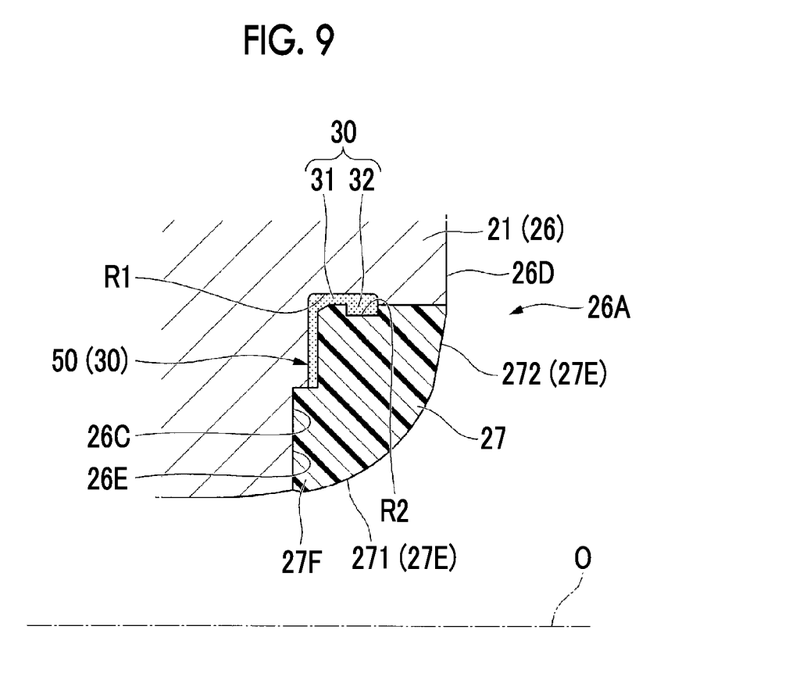
FIG. 9 is a diagram illustrating a state following the assembly of the impeller cover according to the third embodiment of the present invention.

The configuration that is illustrated in FIGS. 8 and 9 can be adopted as well. The abradable seal section 27 that is illustrated in FIG. 8 has not only a recessed groove as the capturing unit 50 formed at a part of the abutting surface 27A (region on the outer side in the radial direction) but also a protrusion portion 27F formed on an inner side of the recessed groove in the radial direction. In addition, a recessed portion 26E corresponding in shape to the protrusion portion 27F is formed in a region on the reference surface 26C of the seal housing section 26A that is on the inner side in the radial direction.

According to the configuration described above, the protrusion portion 27F is fitted with respect to the recessed portion 26E, and thus an end portion of the capturing unit 50 (recessed groove) on the inner side in the radial direction is blocked by the protrusion portion 27F. Accordingly, the likelihood of exudation of the surplus filling material 30 toward the inner side in the radial direction can be further reduced.

In addition, according to the configuration described above, the positioning accuracy of the abradable seal section 27 in the radial direction can be further improved by the protrusion portion 27F formed on the abutting surface 27A.

Figure 11:
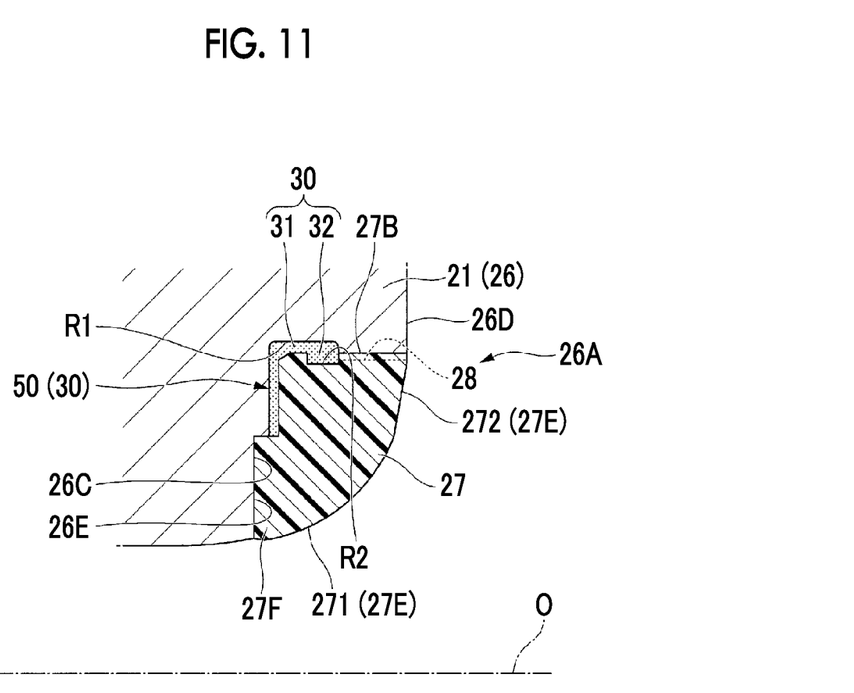
FIG. 11 is a diagram illustrating a state following assembly of an impeller cover according to a modification example of the present invention.
Figure 12:
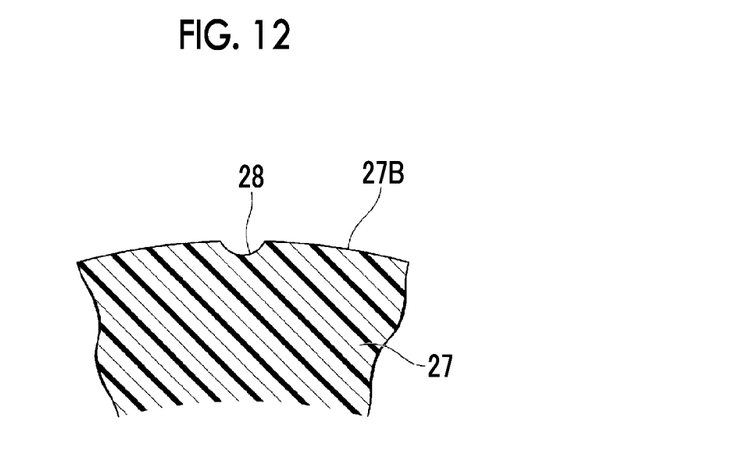
FIG. 12 is an enlarged view of a main portion of the impeller cover according to the modification example of the present invention that is seen from the axial direction.

An air vent groove 28 extending in the direction of the axis O may also be formed, as illustrated in FIGS. 11 and 12, at one or more locations on the inlay portion 27B of the abradable seal section 27 that is illustrated in FIG. 8. More specifically, this air vent groove 28 is a linear recessed groove extending from the first groove portion R1 toward the other side in the direction of the axis O. An end portion of the air vent groove 28 on the other side in the direction of the axis O communicates with the outside. In this configuration, air interposed between the capturing unit 50 (recessed groove) and the first and second groove portions R1 and R2 is released to the outside through the air vent groove 28 when the abradable seal section 27 is inserted into the seal housing section 26A. Accordingly, the force that is required for the press fitting of the abradable seal section can be reduced and workability can be improved.

EXAMPLE

Hereinafter, an example according to the present invention will be described with reference to Table 1. As described above in the first embodiment, the abradable seal section 27 is configured to cover at least a part of the dimension of the compressor blade 25 in the meridian direction in the state where the abradable seal section 27 is housed in the seal housing section 26A (refer to FIG. 3). In addition, the connection portion of the abradable seal section 27 extends radially outwards beyond the outlet side of the compressor blade 25 (end portion on the outer side in the radial direction).

TABLE 1

|  | Clearance | | | A: Peak efficiency | B: Low flow rate efficiency | C: Choke |
| --- | --- | --- | --- | --- | --- | --- |
|  | m: 0 to 0.33 | 0.33 to 0.67 | 0.67 to 1 | (178,000 rpm) | (133,000 rpm) | flow rate efficiency |
| Case 0 | 0.3 mm | 0.3 mm | 0.3 mm | — | — | — |
| Case 1 | 0.3 mm | 0.3 mm | 0.1 mm | +1.3% | +0.5% | 100% |
| Case 2 | 0.3 mm | 0.1 mm | 0.1 mm | +2.4% | +0.5% | 100% |
| Case 3 | 0.1 mm | 0.1 mm | 0.1 mm | +3.2% | +0.5% | 97% |

Various characteristic values of the compressor 4 have been evaluated by a plurality of models, in which the position of placement of the abradable seal section 27 varies, being used. Specifically, as illustrated in Table 1, the peak efficiency (maximum compression efficiency value) at a rated rotation speed (rated flow rate), the compression efficiency (low flow rate efficiency) at a rotation speed lower than the rated value (low rotation speed), and the choke flow rate ratio have been respectively measured in the plurality of models in which the placement of the abradable seal section 27 varies. The rotation speed of the compressor 4 during the peak efficiency measurement was 178,000 rpm, and the rotation speed of the compressor 4 during the low flow rate efficiency measurement was 133,000 rpm. Under these measurement conditions, measurement tests have been conducted with regard to four cases of different clearances between the tip portion of the compressor impeller 24 and the shroud surface 271 of the abradable seal section 27 and different positions (m) of the shroud surface 271 with respect to the meridian length of the compressor blade 25. In Table 1, m represents a relative position of the compressor blade 25 in the meridian direction, 0 represents the end portion (inlet) on the side in the direction of the axis O, and 1 represents the end portion (outlet) on the other side in the direction of the axis O.

Case 0, for example, shows a state where the shroud surface 271 is at a distance of 0.3 mm from the tip side of the compressor blade 25 over the entire meridian length. In other words, Case 0 is an imitation of a configuration that is not provided with the abradable seal section 27. Cases 1 to 3 differ from one another in terms of the value of m. In other words, the dimension of separation between the shroud surface 271 and the tip portion partially varies over the meridian length of the compressor blade 25.

More specifically, in Case 1, the separation dimension is 0.1 mm with respect to the meridian length in the region of 0.67 to 1 based on the inlet side end portion of the compressor blade 25 as a reference. In other words, Case 1 is an imitation of a configuration in which the abradable seal section 27 is lopsided on the outlet side of the compressor blade 25.

In Case 2, the separation dimension is 0.1 mm with respect to the meridian length in the region of 0.33 to 0.67 based on the inlet side end portion of the compressor blade 25 as a reference. In other words, Case 2 is an imitation of a configuration in which the abradable seal section 27 is lopsided in an intermediate portion of the compressor blade 25 (middle region in the meridian length).

In Case 3, the separation dimension is 0.1 mm in the region of 0 to 0.33 based on the inlet side end portion of the compressor blade 25 as a reference. In other words, Case 3 is an imitation of a configuration in which the abradable seal section 27 is lopsided on the inlet side of the compressor blade 25.

Table 1 shows, on a percentage basis, an increase and a decrease in each measurement result (peak efficiency, low flow rate efficiency, choke flow rate) of Case 1 to Case 3 with respect to Case 0 in the configurations of Case 0 to Case 3 described above.

As shown in the table, the peak efficiency has increased in each of Case 1 to Case 3. Specifically, the rate of increase was 1.3% in Case 1, 2.4% in Case 2, and 3.2% in Case 3.

The low flow rate efficiency has increased in each of Case 1 to Case 3. Case 3, in particular, showed a rate of increase of 0.6% with respect to Case 0, and it has been witnessed that a more effective result was obtained in Case 3 than in Case 1 and Case 2.

When it comes to the choke flow rate ratio, each of Case 1 and Case 2 yielded the same result as Case 0 whereas Case 3 showed a decrease of 3%. This choke flow rate ratio shows, on a percentage basis, an increase and a decrease in choke flow rate under each of the conditions of Case 1 to Case 3 based on the flow rate at a point in time when choke occurred in the configuration of Case 0 (choke flow rate) as a reference. In other words, it has been witnessed from the result of Table 1 that the choke flow rate in Case 3 showed a decline of 3% with respect to Case 0.

As described above, it has been found from the measurement test result shown in Table 1 that excellent peak efficiency was obtained in the configurations of Case 2 and Case 3. It has also been found from the decrease in choke flow rate ratio in Case 3 that the configuration of Case 2 is the most suitable one in a case where peak efficiency and a wide operation region (flow rate range) are pursued at the same time. In other words, the configuration of the abradable seal section 27 described above in the first embodiment is capable of ensuring excellent compression efficiency (turbocharging efficiency) and a sufficiently wide operation region.

INDUSTRIAL APPLICABILITY

The impeller cover 21, the rotary machine, and the method for manufacturing the impeller cover 21 described above can be applied to, for example, the turbocharger compressor 4. Then, a rotary machine that has a sufficient level of efficiency can be manufactured with ease.

REFERENCE SIGNS LIST

1 Turbocharger
2 Rotary shaft
3 Turbine
4 Compressor
5 Housing connection portion
6 Bearing
11 Turbine housing
12 Scroll passage
13 Discharge port
14 Turbine impeller
15 Turbine blade
21 Compressor housing
21 Impeller cover
22 Compressor passage
23 Suction port
24 Compressor impeller
24 Impeller
25 Compressor blade
25 Blade
26 Cover main body
27 Abradable seal section
30 Filling material
31 First hardened portion
32 Second hardened portion
40 Positioning pin
50 Capturing unit
90 Press fitting jig
91 Center pin
92 Press fitting ring
93 Flange portion
94 Tapered portion
271 Shroud surface
272 Connection surface
26A Seal housing section
26B Fitting inner peripheral surface
26C Reference surface
26D Vertical surface
26E Recessed portion
27A Abutting surface
27B Inlay portion
27C Insertion portion
27D Tapered surface
27E Flow path surface
27F Protrusion portion
AR Air
G Exhaust gas
H1 First hole portion
H2 Second hole portion
O Axis
R1 First groove portion
R2 Second groove portion
Vs Shroud reference plane

The invention claimed is:

1. An impeller cover comprising:
a machinable abradable seal section including a shroud surface configured to be facing an outer peripheral surface of an impeller rotating about an axis and providing sealing between the outer peripheral surface and the shroud surface;
a cover main body covering the impeller from an outside and including a seal housing section in which the abradable seal section is housed; and
a filling material interposed between the abradable seal section and the cover main body,
wherein the seal housing section has a fitting inner peripheral surface extending along an axis for an outer peripheral surface of the abradable seal section to be fitted to the fitting inner peripheral surface and a reference surface positioning the abradable seal section in an axial direction by abutting against the abradable seal section from one side in the axial direction,
wherein the seal housing section has a plurality of capturing units capturing a surplus of the filling material by forming a gap in at least a part of a space between the abradable seal section and the seal housing section,
wherein a first groove portion recessed radially outwards and extending in a peripheral direction is formed in the fitting inner peripheral surface, and
wherein a second groove portion extending in the peripheral direction in a region facing the first groove portion and having an axial dimension smaller than an axial dimension of the first groove portion is formed in the outer peripheral surface of the abradable seal section,
wherein the capturing units are recessed grooves formed in at least a part of an end face on the one side in the axial direction of the abradable seal section and the recessed grooves radially extend from an axis,
end portions of the recessed grooves on an outer side in a radial direction are connected to the first groove portion, and
end portions of the recessed grooves located on the outer side in the radial direction are connected to a first side of the first groove portion, the recessed portion extending in the radial direction of the axis, perpendicular to said first groove portion, and
the second groove portion is formed at a position of a second side opposite of said first side of the first groove portion, is formed at a position superposed on the second side when viewed from the radial direction, extends in the radial direction of the axis, perpendicular to said first groove portion.

2. The impeller cover according to claim 1,
wherein the abradable seal section further includes a connection surface providing continuous connection between an end portion of the shroud surface on an outer side in a radial direction and an inner peripheral surface of the cover main body.

3. The impeller cover according to claim 1,
wherein the abradable seal section is made of a resin material obtained by a fluororesin being defluoridated.

4. A rotary machine comprising:
a rotary shaft extending along an axis;
an impeller including a disk fixed to the rotary shaft and protruding radially outwards and a plurality of blades spaced apart from one another in a peripheral direction on a surface facing one side of the disk in an axial direction and forming a flow path extending radially outwards from the one side in the axial direction; and
the impeller cover according to claim 1.

5. The rotary machine according to claim 4,
wherein the abradable seal section covers a region equivalent to at least one-third of a dimension of the blade in a meridian direction from the one side in the axial direction.

6. A method for manufacturing the impeller cover according to claim 1, comprising:
a step of forming the shroud surface by processing the abradable seal section;

a step of applying the filling material to the seal housing section;

a step of fitting the abradable seal section to the seal housing section in a state where the filling material is interposed; and a step of press-fitting the abradable seal section from the other side in the axial direction.

7. The impeller cover according to claim 2,
wherein the abradable seal section is made of a resin material obtained by a fluororesin being defluoridated.

8. A rotary machine comprising:

a rotary shaft extending along an axis;

an impeller including a disk fixed to the rotary shaft and protruding radially outwards and a plurality of blades spaced apart from one another in a peripheral direction on a surface facing one side of the disk in an axial direction and forming a flow path extending radially outwards from the one side in the axial direction; and the impeller cover according to claim 2.

9. A rotary machine comprising:

a rotary shaft extending along an axis;

an impeller including a disk fixed to the rotary shaft and protruding radially outwards and a plurality of blades spaced apart from one another in a peripheral direction on a surface facing one side of the disk in an axial direction and forming a flow path extending radially outwards from the one side in the axial direction; and the impeller cover according to claim 3.

* * * * *